United States Patent [19]

Quigniot

[11] 4,010,813
[45] Mar. 8, 1977

[54] LEADING LINK TYPE INDEPENDENT SYSTEMS

[76] Inventor: André Quigniot, 161, rue de Larmor, 56100 Lorient (Morbihan), France

[22] Filed: Mar. 10, 1976

[21] Appl. No.: 665,391

[52] U.S. Cl. .............................. 180/73 C; 280/711
[51] Int. Cl.² .............................................. B62D 7/00
[58] Field of Search .......... 180/73 C, 73 D, 73 TC, 180/73 R, 96.1, 71, 75, 93, 94, 96 R; 280/663, 672, 673, 674, 688, 698, 702, 711, 713

[56] References Cited

UNITED STATES PATENTS

| | | | |
|---|---|---|---|
| 3,746,363 | 7/1973 | Borns | 280/713 |
| 3,879,051 | 4/1975 | Kolbe | 280/663 |

*Primary Examiner*—Philip Goodman

[57] ABSTRACT

In a leading link type independent suspension system a pair of leading links are mounted for oscillating movement on the vehicle chassis. A half axle is fixed to each leading link and is pivotally connected to a stub axle by a vertical swivel pin. An assembly mounted between each link and its half axle comprises a deformable chamber disposed in parallel with an anti-roll damper, a clevis with a vertical pivot axis connecting the deformable chamber to an arm fixed to its leading link. One of the ends of each anti-roll damper is connected to its associated clevis. A connecting bar with ball joints interconnects the clevises of the pair of leading links. The half axles are blocked by pneumatic jacks during backing up movement of the vehicle. A safety microswitch controls the supply of compressed air to the deformable chamber and is mounted on each leading link for detecting pivotal movements of the associated half axle.

6 Claims, 3 Drawing Figures

LEADING LINK TYPE INDEPENDENT SYSTEMS

The present invention relates to independent suspension systems, particularly of the so-called leading link or Dubonnet type.

In this type of suspension system which has been known for a long time a stub axle is rigidly connected to a half axle fixed to an oscillating independent leading link or arm.

Other suspension systems are known in which are connected to stub axles pivotal mounting forming an assembly connected to a single rigid axle, employing pneumatic bellows and shock absorbers, of the simple quadrilateral type which by means of an equalizing valve, a rod and an arm, in the best possible condition with conventional springs are intended to absorb bumps and high frequency vibrations inparted to a motor vehicle, trailer or a semi-trailer moving along a road.

Such systems do not allow the single or double wheels, particularly those of heavy lorries or trucks, to remain perpendicular to the radii of the turning circle when taking a curve.

An aim of the present invention is precisely to make the axles self-orienting by providing a suspension system automatically assuring the orientation of each wheel or group of wheels as a function of the turning circle for a curve.

According to the invention there is provided an independent suspension system of the so-called leading link or Dubonnet type comprising a half axle fixed to each leading link, a stub axle pivotally connected to each half axle by a vertical pivot, an assembly mounted between the leading link and the half axle comprising an elastic chamber in parallel with an anti-roll damper said elastic chamber being connected pivotally by a vertical axis clevis to an arm fixed to the half axle, one of the ends of the anti-roll damper being connected to said clevis, the clevis of each pair of leading links being interconnected by a connecting bar with ball joints.

Other features and advantages of the present invention will be brought out in the following description of an embodiment of the present suspension system given merely by way of example with reference to the accompanying drawing, in which.

Figure 1:
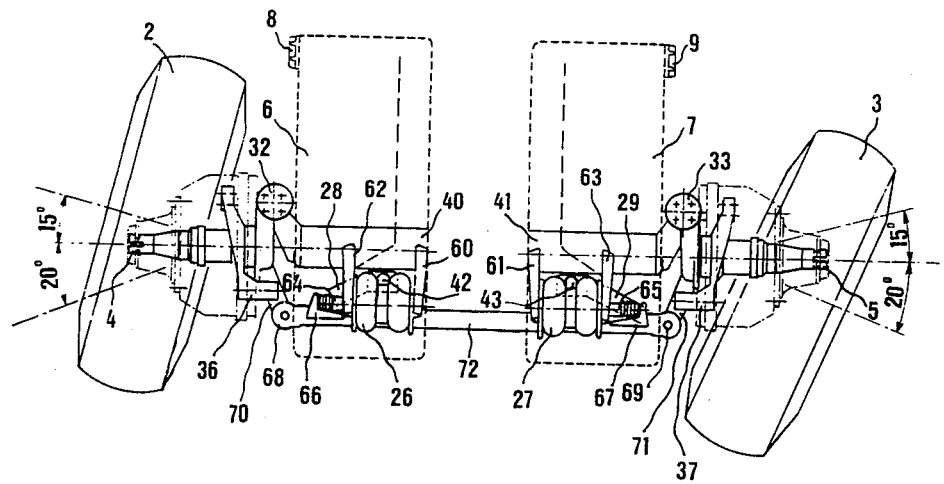
FIG. 1 is a top plan view of the preferred embodiment of the suspension system according to the present invention.
Figure 2:
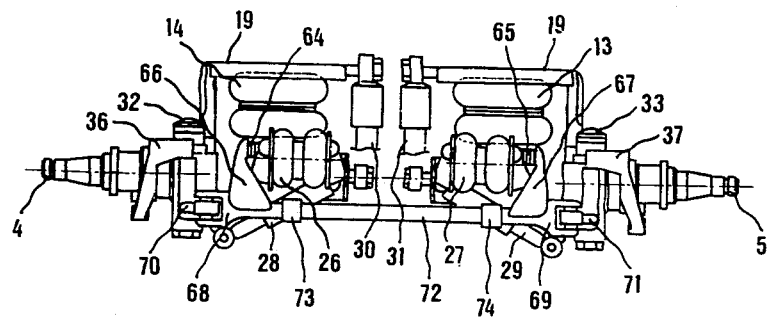
FIG. 2 shows a front elevation view of the suspension system in FIG. 1.

FIGS. 1 and 2 show a pair of independent leading links 6 and 7 mounted for oscillating movement about horizontal pivots 8 and 9 rigidly fixed to the chassis 19 of the vehicle. A half axle 40,41 is fixed to each leading link 6,7; the half axles 40,41 are pivotally connected in turn to stub axles 4,5 by vertical swivel pins 32,33.

Each stub axle 4,5 carries a wheel 2,3 (or a pair of wheels) and a brake support 36,37.

Between the chassis 19 and each leading link 6,7 a pneumatic bellows 13, 14 and a shock absorber 30,31 are interposed as is conventional.

An elactic chamber 26,27 is fixed on each leading link 6,7 between two flanges 60, 61 and 62,63 which are integral with their respective links 6,7.

Each of the flanges 62,63 has an opening for the displacement of a compression piston 64,65 in its elastic chamber 26,27. The outer end of each piston 64, 65 is fixed to a gusset plate 66,67 which in turn is welded to a clevis 68,69, with a vertical axis. The clevis 68,69 is pivotally mounted on a pin carried by arms 70, 71 rigidly connected to the half axle 4,5. The two clevises 68,69, are connected to each other by a connecting bar 72 with ball joints 73, 74 schematically represented.

An anti-roll damper 28,29 is arranged in parallel with each of the elastic chambers 26, 27 one end of the anti-roll damper is fixed to the leading link 6,7 and the other to the clevis 68,69.

Figure 3:
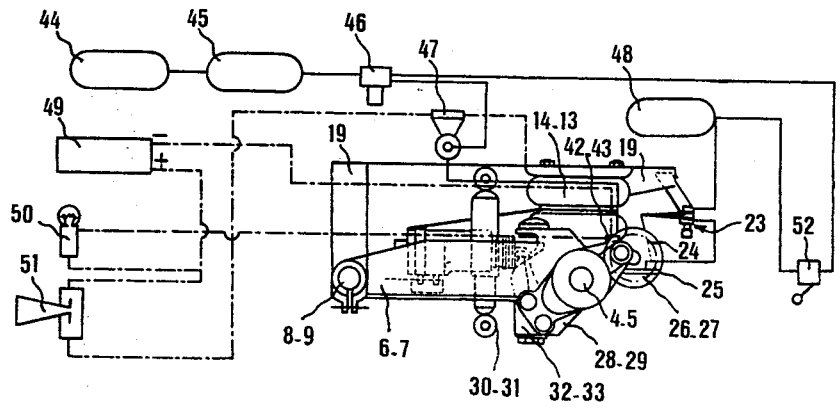
FIG. 3 shows a side elevation view of the suspension system of FIGS. 1 and 2 with a block diagram of the control circuitry therefor.

Each elastic chamber 26,27 is connected (FIG. 3) to a buffer vessel 48 via an equalizing valve 23 (one for each leading link). Each equalizing valve 23 is mounted on chassis 19 and is controlled by a rod 24 and an arm 25 joined to the leading link 6,7.

The buffer vessel 48 is connected to auxiliary storage vessels 44 and 45 of compressed air for the vehicle through a safety microswitch 52 and a pressure control device 46.

A microswitch 52 is mounted on each leading link 6,7 and may be secured for example to the non rotatable portion of the swivel pin 32, 33; the microswitches 52 are actuated by the pivotal movement of the stub axles 4,5 about their swivel pins 32,33. The two microswitches 52 are connected in series in the line or conduit between the buffer vessel 48 and the pressure control device 46.

The pressure control device 46 is connected to an electrically operated valve 47 which in turn is connected to two blocking devices, preferably small pneumatic jacks or piston and cylinder units 42, 43 for each half axle. Each pneumatic jack 42, 43 is fastened to a corresponding leading link 6, 7. The piston rods of the cylinders 42, 43 are adapted to block in a known manner displacements of the elastic chamber 26, 27 in both directions. The electrically operated valve 47 is connected to a half axle-blocking control device 51; a warning light indicates that the half axles are blocked. The electrical power supply is provided by a storage battery 49.

Such a suspension system makes it possible when taking a curve for the stub axle 4 of the outside wheel to have a less pronounced angle of inclination than the stub axle 5 of the inside wheel. The wheels remain perpendicular to the radii of the turning circle when negotiating the curve and transmit through the arms 70, 71, the clevises 68,69, the gusset plates 66,67 pneumatically stabilized pressure to the elastic chambers 26, 27.

The buffer vessel 48 and the equalizing valves 23 have the function of preventing even during collapse of the elastic chambers 26, 27, a pressure greater than necessary for returning the wheels to their initial position.

The pressure control device 46 is responsible for the control of the pressure in the elastic chamber since there is a large difference in the friction force exerted on the tires depending on whether the vehicle is loaded or not. The pressure in the elastic chambers must not be less than 6 atmospheres. The pressure control device may be located on the vehicle wherever appropriate.

When the vehicle is not carrying a load, the pressure control device 46 must be in a position introduced that the equalizing valves 23 may be intriduced for supplying air to each elastic chamber.

When the vehicle is loaded the pressure control device 46 must be in the maximum pressure position.

The axle blocking device operates as follows.

In reverse gear the half axles 40,41 must be blocked, in other words they must operate as a normal axle fixed to the leading links. Before backing up the vehicle, the control lever 51 is actuated which opens the circuit supplying the pneumatic jacks 42, 43, the piston rods thereof blocking the elastic chamber 26, 27. The warning light 50 is illuminated indicating that the two half axles are blocked.

As soon as the backing up manoeuver is completed, the control lever 51 must be actuated once again to cut off the supply of air to the pneumatic jacks 42, 43 and exhaust the air therefrom. The piston of each pneumatic jacks 42,43 returns to its initial position thereby releasing the selforientating half axles. The boocking control lever 51 for blocking the half axles is within the driver's reach inside the cab of the vehicle. The function of the safety microswitches 52 is to trigger the opening of the equalizing valves 23 for supplying the elastic chamber 26,27, should the driver forget to return the control lever 51 to its initial position. This is a safety feature which could obviously be optional equipment.

It goes without say that the invention is not limited to the particular embodiment described herein where the two half axles each have one wheel but encompasses all modifications, alternatives and equivalents within the scope of the appended claims, namely where each of the half axles carries a pair of wheels.

The suspension system according to the invention may be used in different ways in the motor vehicle industry as well as the railway car construction industry. In the motor vehicle industry the present suspension system may be used for heavy vehicles such as heavy lorries or trucks, buses or coaches, trailers, semi-trailers and the like.

The present suspension system results in energy savings, better load distribution, reduced tire wear, improved road safety, and reduced road surface wear.

What I claim is:

1. An independent suspension system of the leading link type for a vehicle, in which a pair of independent leading links are mounted on vehicle frame for oscillating movement, comprising a half axle fixed to each leading link, a stub axle pivotally connected to each half axle by a vertical swivel pin, an assembly mounted between each leading link and its associated half axle including an elastic chamber disposed in parallel with an anti-roll damper, a vertical axis pivot mounting effectively connecting said elastic chamber to its leading link, one of the ends of said anti-roll damper being connected to said vertical axis pivot mounting, and a ball-jointed connecting bar interconnecting both said vertical axis pivot mountings.

2. A suspension system according to claim 1, wherein each said elastic chamber is connected to a buffer vessel through an equalizing valve, a conduit connecting said buffer vessel with a compressed air circuit of the vehicle for supplying compressed air to said buffer vessel.

3. A suspension system according to claim 2, further comprising a pressure control device disposed in the conduit supplying compressed air to said buffer vessel.

4. A suspension system according to claim 1, further comprising means for controlling the blocking of said half axles during backing up movement of the vehicle comprising a pneumatic piston and cylinder unit mounted on each said leading link and adapted to block displacements of its elastic chamber and a control circuit for said pneumatic piston and cylinder unit including an electrically operated valve, means for controlling said valve and a warning signal circuit responsive to said safety valve.

5. A suspension system according to claim 4, further comprising a microswitch for controlling the supply of compressed air to said elastic chamber mounted on each said leading link and detecting pivotal movements of its associated half axle.

6. A suspension system according to claim 1, further comprising an arm fixed to each half shaft and connecting said elastic chamber to its leading link.

* * * * *